E. D. SCHMITT.
PROCESS OF PRESERVING FOOD PRODUCTS.
APPLICATION FILED SEPT. 19, 1911.
1,041,518.
Patented Oct. 15, 1912.
2 SHEETS—SHEET 1.
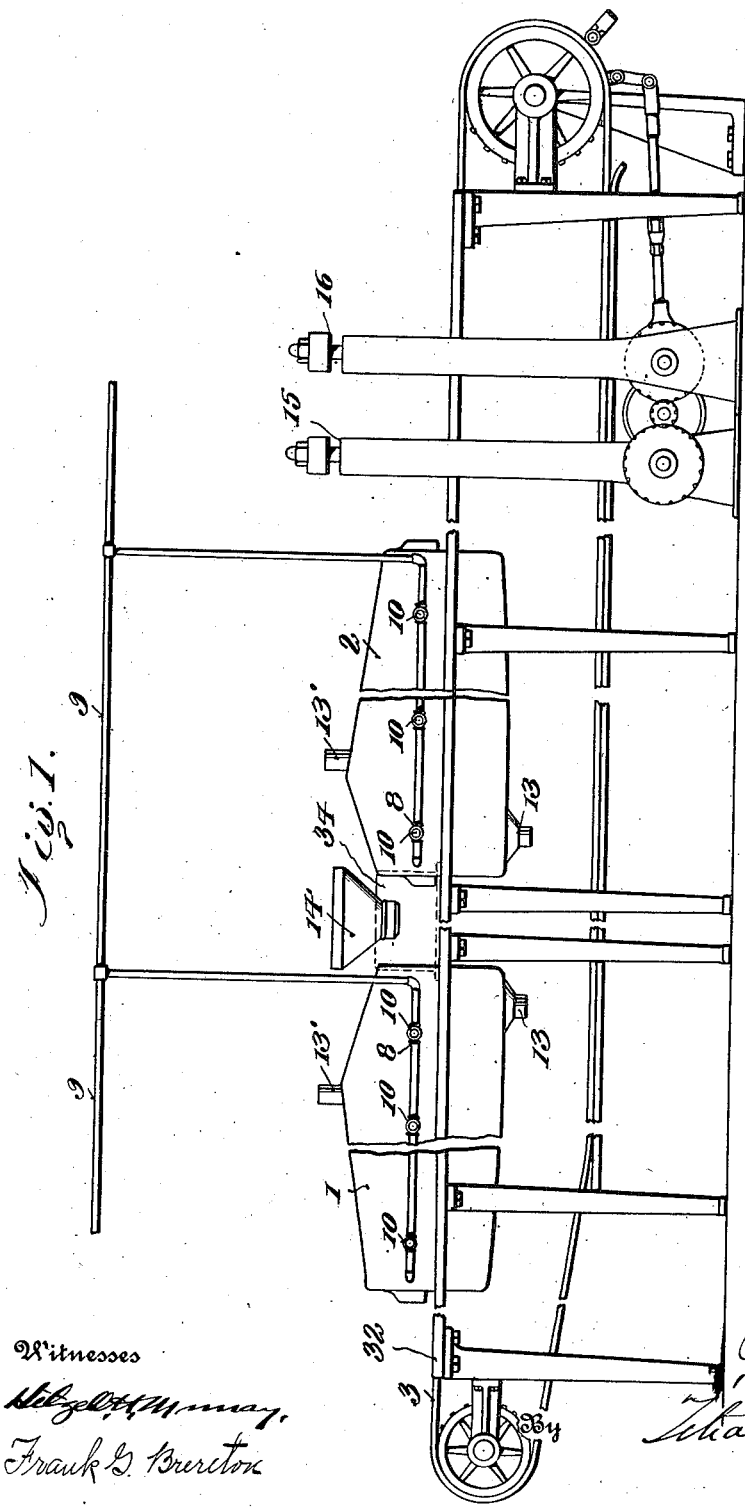

E. D. SCHMITT.
PROCESS OF PRESERVING FOOD PRODUCTS.
APPLICATION FILED SEPT. 19, 1911.
1,041,518.
Patented Oct. 15, 1912.
2 SHEETS—SHEET 2.
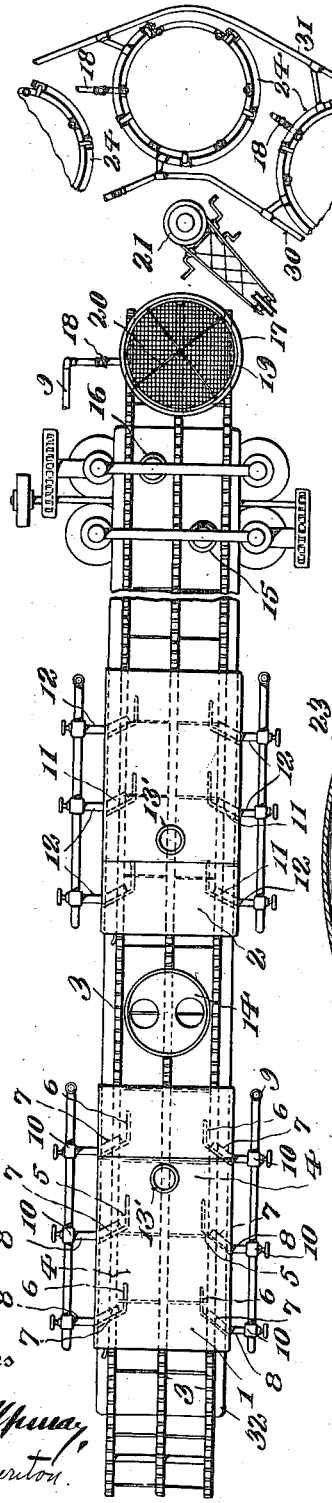
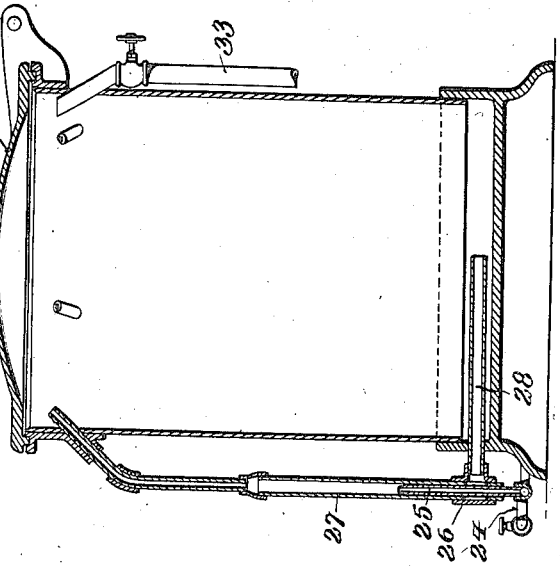
Witnesses
Inventor
Edward D. Schmitt
By
Attorney

UNITED STATES PATENT OFFICE.

EDWARD D. SCHMITT, OF BALTIMORE, MARYLAND, ASSIGNOR TO THE PURE FOOD PROCESS COMPANY, OF BALTIMORE, MARYLAND, A CORPORATION OF MARYLAND.

PROCESS OF PRESERVING FOOD PRODUCTS.

1,041,518.   Specification of Letters Patent.   Patented Oct. 15, 1912.

Application filed September 19, 1911. Serial No. 650,297.

*To all whom it may concern:*

Be it known that I, EDWARD D. SCHMITT, a citizen of the United States, residing in Baltimore city and State of Maryland, have invented certain new and useful Improvements in Processes of Preserving Food Products, of which the following is a specification.

This invention relates to a new and improved process of preserving food-products; and it has for its chief object the successful and economical cooking of food-products, particularly vegetables and fruits, in sealed non-metallic vessels, preferably glass.

Heretofore, various attempts have been made to cook food-products in sealed glass vessels, but all such attempts so far as is known to applicant, have proved absolute failures, by reason of the great loss sustained in cracked and broken vessels, and the consequent additional loss of the product contained in the damaged vessels, the cracking and breaking of the vessels being chiefly due, first, to the failure to properly bring the vessels to a condition to receive the product to be processed; second, the failure to maintain the vessels and contained product at approximately the same relative degree of temperature before and during the process of cooking, and third; the failure to provide a safe and effective means of cooling the vessels and their cooked contents.

In cooking food-products, such as vegetables and fruits, in sealed glass vessels, I have found, after much experimenting, that in order to eliminate the danger of cracking the vessel during the act of processing, the vessel and product, whether in its uncooked or partly cooked state, must be of the same, or approximately the same temperature at the time the vessels are filled, and that this equalization in temperature must be maintained until the cap or seal is applied to the vessel and the filled and sealed vessel transferred to the cooker, it being highly important, to a successful and economical carrying out of the process, that when the contents of the vessel is subjected to the final cooking, both vessel and contents must be at approximately the same temperature. It is also highly important to the successful and economical carrying out of the process, that the vessel and its cooked contents be gradually cooled, so as to avoid the danger of cracking and breaking the vessel, which so often occurs where the cooling is effected too quickly and at uneven temperatures of the vessel and its contents.

In cases where the vegetables or fruits to be cooked are in their raw or uncooked state, and a hot brine, sauce or syrup is to be used, it is unnecessary to first condition or temper the vessels, but as the vessels and their contents are about the same temperature they are passed through zones of gradually increasing degrees of heat, so that both vessels and their contents may be gradually heated to the same temperature, which will be about the same temperature as that of the brine, sauce or syrup to be added to the contents of the vessels. After the brine, sauce or syrup has been added, the vessels and the heated product contained therein are passed through a zone of greater intensity of heat, to bring the vessels and their contents to an equal degree of temperature, and to allow the vapors to escape before sealing is effected.

Where the product is not to be brined, sauced, or syruped, but is placed cold in the vessels, or what is termed "dry-packed", the vessels and their contents are first subjected to gradually increasing degrees of heat, to bring both the vessels and their contents to the proper degree of temperature and to exhaust the deleterious fumes only therefrom, and then to a zone of heat of greater intensity to insure an equal temperature between the vessels and their contents, preparatory to sealing and cooking.

In partly cooked products, the glass or non-metallic vessels are first subjected to zones of gradually-increasing degrees of heat until they are brought to a temperature approximately equaling that of the partly-cooked product to be placed therein, which in most cases ranges from 150 to 180 degrees, it being necessary to bring the vessels and product to approximately the same degrees of heat, so as to avoid the danger of cracking or breaking the vessels, the vessels and contained partly-cooked product are then passed through a zone of uniform temperature, about 212 degrees in order to more fully establish the equality of temperature between the vessels and the contained product, and to permit any vaporous fumes arising from the hot contents of the vessels to escape from the chamber of uniform temperature before the sealing-operation takes place, and after the sealing has been effected the sealed vessels and their contents are passed to a suitable cooker, whose temperature is approximately that of the sealed vessels and their contents, and the temperature raised to the cooking point, which is from 240 to 260 degrees, according to the character of the product being processed or cooked.

In practising the process, I prefer to employ an apparatus similar to that illustrated in the accompanying drawings, in which:

Figure 1 is a side elevation of a portion of the apparatus, showing the conditioning-chamber, filler, equalizer-chamber, and sealing devices; Fig. 2 is a diagrammatic top plan view of the apparatus complete, and Fig. 3 is a vertical, central section of one of the cookers, showing means for cooling the vessels and contained product after cooking.

Referring to the several views, the numeral 1 indicates a steam conditioning-chamber; 2 a steam equalizing-chamber, and 3 an endless sprocket-chain adapted to travel, with a step-by-step movement, through said chambers.

The conditioning-chamber is divided into a number of compartments or heat zones 4 by deflector-plates 5 extending from the top to the bottom of the chamber. Each deflector-plate is provided with a longitudinal extension 6, against which the heating-fluid from a jet-pipe 7 is projected, and prevented from coming into immediate, direct contact with the vessels. The jet-pipes are supplied with heating-fluid from pipes 8, arranged one at each side of said chamber, said pipes 8 being connected with a main feed-pipe 9. Each pipe 8 is provided with a valve 10 for admitting and cutting off the heating-fluid, and each jet-pipe with a needle-valve to control or regulate the inflow of steam. The equalizer-chamber is also provided with a number of jet-pipes 11 supplied with heating-fluid from the main or feed-pipe 9 through pipes 12, and both chambers are provided with suitable drain-pipes 13 and with exits 13' for the escape of the fumes or vapors arising from the product being heated. Situated between the conditioning and equalizing-chambers is a filler 14, which, in some cases, may be used to add brine, syrup, or sauce to the product to be cooked. Situated adjacent to the outer end of the equalizer-chamber are two sealing-machines 15 and 16, and mechanism for operating them in unison to hermetically seal the contents of the vessels before subjecting them to final cooking. Arranged to one side of the sealing machines, and in close proximity thereto, is a suitable tank 17 into which steam is admitted, from the main feed-pipe 9, by a branch-pipe 18, and removably-seated within the tank is a crate or cage 19, said crate being provided with a bail 20, by means of which it may be lifted from the tank. The sealed vessels are preferably placed in tiers in the crate, and when filled, a crane 21 is employed to lift it out of the steam tank, the temperature of which is approximately that of the equalizer-chamber, and convey it to one of a battery of cookers 22.

Each cooker comprises a suitable tank or vessel having a hinged steam-tight cover 23, and partly encircling the tank is a feed-pipe 24 having connected therewith at suitable intervals, a number of injectors 25, which pass through packed T-connections 26. To the upper end of each of these connections is connected a supply-pipe 27 which enters the tank at the upper part thereof. Communicating with each supply-pipe 27 is a horizontal eduction-pipe 28. Connected with the feed-pipe 24 is a valved pipe 30 for admitting water to the tank through the medium of the supply-pipes 27, and also connected with said feed-pipe 27 is a valved pipe 31 for admitting a heating-fluid to said tank through the medium of the supply-pipes 27.

All fruits, and some vegetables, are placed in the vessels at normal temperature, the vessels also being at normal temperature, and in the first step of the process the vessels and contained product are brought from normal temperature to that of either the syrup, brine or sauce, the temperature of which varies from 180 to 210 degrees, according to the character of the fruits or vegetables being processed. In the second step of the process, the temperature of the vessels and contained product is increased to 212 degrees, so as to bring said vessels and contents to a uniform or even temperature and thereby prepare the vessels to sustain the shock of capping or sealing.

The temperature for some of the different products during the cooking process varies, for instance, the temperature for peaches, cherries and berries is brought to 212 degrees for varying lengths of time, while in vegetables the temperature varies from 216 to 240 degrees and in all marine products and meats, which are placed in the vessels at normal temperature, the temperature during the cooking process varies from 238 to 255 degrees, the essential feature of the invention being that in the processing of all products, the temperature of both the vessel and product must be approximately the same at the time the "filling" operation takes place.

In processing partly-cooked vegetables, for example corn, which is heated to a temperature of about 150 degrees, the glass vessels are placed upon a table 32, situated at the entrance to the conditioning chamber, from whence they are conveyed by the endless chain through the several heat-zones of the equalizer, the heat in the successive zones being gradually increased from a moderate to a high heat, so that in passing through the first heat zone, the vessels will be subjected to a certain degree of heat, and in passing through the remaining zones, they will be subjected to gradually-increasing degrees of heat, each succeeding zone being at a higher temperature than the preceding one, so that when the vessels have been subjected to the higher degree of heat in the last zone, they will be thoroughly sterilized and properly conditioned or tempered to receive the partly-cooked corn, the temperature of the vessels being approximately the same as that of the partly-cooked corn, or about 150 degrees. The conditioned or tempered vessels are then brought under the filler and filled with the partly-cooked corn, after which the filled vessels are passed through the equalizer, the temperature of which is somewhat greater than that of the last-zone of heat of the conditioning-chamber, to establish complete equilibrium between the vessels and their contents; to allow the vapors or fumes to escape, and also to fully prepare the filled vessels for the sealing operation. After being hermetically sealed, the filled and sealed vessels are preferably crated and conveyed to one of the cookers, the temperature of which is approximately the same as that of the equalizer-chamber. As soon as the filled and sealed vessels are placed in the cooker, the temperature therein is increased to the cooking-point, which ranges from about 240 degrees to about 260 degrees.

After being thoroughly cooked, the sealed vessels are gradually cooled, the cooling being effected by cutting off the heating-fluid, which is preferably steam, and admitting cold water under pressure. As the water enters at the top of the tank, through the supply-pipes 27, the hot water will be gradually displaced, passing out through the valved overflow-pipe 33. The displacement of the hot water by the inflowing cold water being so gradual, the cooling of the sealed vessels and their contents, must of necessity also be gradual, so that all danger of the vessels cracking or breaking by a too sudden change of temperature, is practically eliminated, thus materially assisting in successfully and economically carrying out the process of processing food-products in sealed glass vessels.

In processing cold or uncooked products, which do not require the addition of brine, sauce, or syrup, I prefer to remove the "filler" or "briner", in the space between the conditioning and equalizing-chambers, and inclose said space by a suitable hood 34, shown in dotted lines, Fig. 1, so as to form an intermediate heat-chamber, and thus provide a series of uninterrupted heat-chambers for the treatment of the vessels and contained product, up to the time of effecting the sealing. The filled vessels pass from the conditioning-chamber to the equalizer-chamber without any loss in temperature.

Having thus described my invention, what I claim is:

1. The process of cooking food-products in hermetically-sealed non-metallic vessels, consisting in filling the vessel with a product of approximately the same temperature as that of the vessel; then subjecting the filled vessel to heat of greater intensity than the temperature of the vessel and contents, so as to equalize the temperature of the same; then hermetically sealing the vessel, and finally subjecting the sealed vessel and contents to the action of a heating-fluid of sufficient heat capacity to cook the contents.

2. The process of cooking food-products in hermetically-sealed non-metallic vessels, consisting in filling the vessel with a product of approximately the same temperature as that of the vessel; then subjecting the filled vessel to heat of a higher temperature than that of the vessel and contents, so as to equalize the temperature of the same; then hermetically sealing the vessel; then subjecting the sealed vessel and contents to the action of a heating-fluid of sufficient heat-capacity to cook said contents, and finally cooling the cooked product without removing the vessel from the heating-fluid.

3. The process of cooking food-products in hermetically-sealed non-metallic vessels, consisting in filling the vessel with a product of approximately the same temperature as that of the vessel; then subjecting the filled vessel to heat of a higher temperature than that of the vessel and contents, so as to equalize the temperature of the same and to thoroughly exhaust the gases or fumes arising from the product; then hermetically sealing the vessel; then subjecting the sealed vessel and contents to the action of a heating-fluid of sufficient heat-capacity to cook said contents, and finally gradually displacing the heating-fluid with cold water, so as to cool the product without the danger of cracking or breaking the vessel.

4. The process of cooking food-products in hermetically sealed non-metallic vessels, comprising the following steps, first, subjecting the vessel to successively increased zones of heat, so as to bring the vessel to approximately the same degree of temperature as that of the product to be placed therein;

second, filling the vessel with said product; third, passing the filled vessel through a zone of heat of higher temperature than that of the vessel and contents so as to thoroughly exhaust the gases and fumes arising from the product and to equalize the temperature of the vessel and contents for final cooking; fourth, hermetically sealing the vessel, and finally, subjecting the sealed vessel and contents to the action of a heating-fluid of a temperature higher than the equalizing temperature to cook the contents.

5. The process of cooking food-products in hermetically-sealed non-metallic vessels, comprising the following steps, first, subjecting the vessel to successively increased zones of heat to bring the vessel to approximately the same degree of temperature as that of the product to be placed therein; second, filling the vessel with the product; third, passing the filled vessel through a zone of heat of higher temperature than that of the vessel and contents, so as to thoroughly exhaust the gases or fumes arising from the product and to equalize the temperature of the vessel and contents for final cooking; fourth, hermetically sealing the vessel; fifth, subjecting the sealed vessel and contents to the action of a heating-fluid of a temperature higher than the equalizing temperature to cook the contents, and finally, gradually cooling the cooked product without removing the vessel from the heating-fluid.

6. The process of cooking food-products in hermetically sealed non-metallic vessels, comprising the following steps, first, subjecting the vessel to successively increased zones of heat to bring the vessel to approximately the same degree of temperature as that of the product to be placed therein; second, filling the vessel with the product; third, passing the filled vessel through a zone of heat of higher temperature than that of the vessel and contained product, so as to thoroughly exhaust the gases or fumes arising from the product and to equalize the temperature of the vessel and contents for final cooking; fourth, hermetically sealing the vessel; fifth, subjecting the sealed vessel and contents to the action of a heating-fluid of a temperature higher than the equalizing temperature to cook the contents, and finally gradually displacing the heating-fluid with cold water, so as to cool the cooked product without removing the vessel.

7. The process of cooking food-products in hermetically-sealed glass vessels, consisting in filling the vessel with a product of a temperature equal with that of the vessel; then passing the vessel and contents through a zone of heat approximately 212 degrees, so as to equalize the temperature of both vessel and contents; then hermetically sealing the vessel, and finally subjecting the sealed vessel and contents to the action of a heating-fluid, the temperature of which is gradually increased from 212 degrees to a temperature sufficiently high to cook the contents.

8. The process of cooking food-products in hermetically-sealed glass-vessels, consisting in filling the vessels with a product the temperature of which is equal to that of the vessel; then passing the vessel and contents through a zone of heat approximately 212 degrees, so as to establish a uniform temperature between the vessel and its contents, and to exhaust the gases or fumes arising from the product; then hermetically sealing the vessel, and finally subjecting the sealed vessel to the action of a heating-fluid varying from 212 degrees to 260 degrees to cook the products.

9. The process of cooking food-products in hermetically sealed glass vessels, consisting in filling the vessel with a product whose temperature is equal with that of the vessel; then passing the vessel and contents through successively increased zones of heat; then through a heating fluid of uniform heat approximately 212 degrees, so as to equalize the temperature between the vessel and its contents; then hermetically sealing the vessel; then subjecting the sealed vessel to the action of a heating-fluid whose temperature is gradually-increased from 212 degrees to a temperature sufficiently high to cook the contents, and finally cooling the cooked product without removing the vessel from the heating-fluid.

10. The process of cooking food-products in hermetically-sealed glass vessels, consisting first, in passing the vessels through successively increased zones of heat, so as to properly condition them to receive a partly cooked-product; second, filling the conditioned vessels with the partly-cooked product; third, passing the fluid vessels, unsealed, through a heating-fluid of uniform but increased temperature, so as to establish an equilibrium of temperature between the vessels and product; fourth, hermetically sealing the vessels, and finally, subjecting the sealed vessels to the action of a heating fluid of a temperature gradually increased from 212 degrees to a temperature sufficiently high to cook the contents.

11. The process of cooking food-products in hermetically-sealed glass vessels, consisting first, in passing the vessels through successively-increased zones of heat, so as to properly condition them to receive a partly-cooked product; second, filling the vessels with the partly-cooked product; third, passing the filled vessels, unsealed, through a heating-fluid of uniform but increased temperature, so as to establish an equilibrium of temperature between the vessels and product, fourth, hermetically sealing the vessels; fifth, subjecting the sealed vessels to the action of a heating-fluid of a temperature gradually increased from 212 degrees to a temperature sufficiently high to cook the contents, and finally, gradually displacing the heating-fluid with cold water, so as to cool the cooked product without removing the vessels.

In testimony whereof I affix my signature in presence of two witnesses.

EDWARD D. SCHMITT.

Witnesses:
　JAMES L. CRAWFORD,
　FRANK G. BRENTON.